US008812255B2

(12) United States Patent
Lynch et al.

(10) Patent No.: US 8,812,255 B2
(45) Date of Patent: Aug. 19, 2014

(54) WIRELESS ROTOR TRACK AND BALANCE SYSTEM FOR ROTORCRAFT

(75) Inventors: Michael A. Lynch, Shelburne, VT (US); Mokhtar Sadok, Williston, VT (US); Radoslaw R. Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 717 days.

(21) Appl. No.: 12/924,466

(22) Filed: Sep. 28, 2010

(65) Prior Publication Data
US 2012/0078544 A1 Mar. 29, 2012

(51) Int. Cl.
G01R 35/00 (2006.01)

(52) U.S. Cl.
USPC .......................................................... 702/89

(58) Field of Classification Search
USPC .................... 702/56–59, 62, 89–91, 183, 185
See application file for complete search history.

(56) References Cited

U.S. PATENT DOCUMENTS

| 4,053,123 A | 10/1977 | Chadwick |
| 4,112,774 A | 9/1978 | Chadwick |
| 4,238,960 A * | 12/1980 | Curtis et al. ..................... 73/462 |
| 4,524,620 A | 6/1985 | Wright et al. |
| 4,531,408 A | 7/1985 | Chadwick et al. |
| 5,083,723 A * | 1/1992 | Grieb et al. ................. 244/1 TD |
| 6,415,206 B1 | 7/2002 | Ventres |
| 6,453,669 B2 | 9/2002 | Kennedy et al. |
| 7,013,210 B2 * | 3/2006 | McBrien et al. .............. 701/100 |
| 8,050,881 B1 * | 11/2011 | Yeung et al. ..................... 702/89 |
| 2011/0191040 A1 * | 8/2011 | Bechhoefer et al. ............ 702/56 |
| 2011/0216660 A1 * | 9/2011 | Lee et al. ....................... 370/252 |
| 2012/0056751 A1 * | 3/2012 | Field .......................... 340/854.6 |

* cited by examiner

*Primary Examiner* — Mohamed Charioui
(74) *Attorney, Agent, or Firm* — Edwards Wildman Palmer LLP; Scott D. Wofsy; Adam P. Daniels (57) ABSTRACT

Disclosed is a rotor track and balance system for rotorcraft that includes a data processing unit, a tachometer sensor and at least one accelerometer. The tachometer sensor is located remotely from the data processing unit and is mounted proximate to the rotating blades of the rotorcraft. The tachometer sensor is adapted to measure the speed and position of the rotating blades and to wirelessly transmit speed and position data to the data processor. The at least one accelerometer is also located remotely from the data processing unit and is mounted proximate the rotating blades of the rotorcraft. Each accelerometer is adapted to measure vibration anomalies in the rotating blades and to wirelessly transmit vibration data to the data processor. The data processing unit synchronizes the wireless data transmitted from the tachometer sensor and the wireless accelerometer(s) and determines necessary adjustments to be made in order to reduce the vibration anomalies in the rotor blades.

20 Claims, 4 Drawing Sheets

WIRELESS ROTOR TRACK AND BALANCE SYSTEM FOR ROTORCRAFT

BACKGROUND OF THE INVENTION

1. Field of the Invention

The subject invention is directed to the field of sensing, autonomous measurement, and wireless communications, and more particularly to, the use of wireless sensors in rotorcraft Rotor Track and Balance (RTB) systems.

2. Background of the Related Art

Wireless sensing has been steadily gaining ground in the aerospace industry. In some applications, data is collected via a set of sensors which are remotely located from data processors. The sensors are connected to these data processors through a heavy harness of numerous and long wires. However in certain applications, these sensors or actuators need to be situated at critical locations, such as near the aircraft engine or on rotating parts of the aircraft making it challenging, if at all possible, to rely on traditional wires and harnesses to provide power to the sensors and a communication link between the sensors and the data processor(s).

Establishing a wireless link instead of using physical wires to communicate with sensors can lead to substantial weight and cost savings in many aerospace applications, but replacing wires with wireless communications is not a simple process. Particular challenges exist when using wireless methods that do not exist in wired systems, such as discontinuous data acquisition, data synchronization, sensor power supply and conservation and others.

In rotorcraft, excess vibration levels lead to premature wear and in some cases to catastrophic failures in rotating components. To improve the safety and readiness of rotorcraft planes it is thus essential to minimize vibration levels in the airframe. Health and Usage Monitoring Systems (HUMS) use vibration measurements to diagnose mechanical health of the aircraft and to suggest possible corrective actions.

Rotor Track and Balance, a function performed by the aircraft HUMS, is the process of detecting and correcting vibrations caused by the main rotor. Vibrations caused by the helicopter main rotor are typically either in a vertical or lateral plan (with respect to the main frame of the rotorcraft) that are respectively due to unequal lift produced by the main rotor blades or to unequal distribution of mass in the main rotor "disk." There are several reasons that can cause these types of undesired vibrations. For instance, most common causes of vertical vibration include variation between chord profiles of the blades and inadequate adjustment of pitch change links and trim tabs.

For the lateral vibration case, minor discrepancies in the manufacturing process may cause blade and other weight differences which may lead to unequal distribution of mass in the main rotor. Moreover, aging and many other reasons can be behind vertical and lateral vibrations in the main rotor. As such, tracking the main rotor vibration profile and taking corrective action to smooth such vibration is the objective of the Rotor Track and Balance system.

The most common corrective action is to place weights on the main rotor hub at specific locations. There are two types of data that need to be acquired to perform RTB: track data and vibration data. Track data is typically acquired using an optical tracker sensor, while vibration data is acquired using accelerometers. For correct interpretation of vibration data, rotor azimuth position sensors, sometimes referred to as tachometer sensors, are also included in RTB systems. Note that the rotor track adjustment feature may be optional and the optical tracker sensor may not be always deployed. Then, vibration and azimuth data alone may be used for rotor balancing only. Traditionally, such limited installations have been also referred to as RTB systems, as they can be always temporarily expanded by addition of rotor track measurement. The present invention pertains primarily to the rotor balancing function of an RTB system, but is also applicable to full installations that also include the rotor track adjustment function. Exemplary rotor track and balance systems are illustrated in U.S. Pat. Nos. 4,531,408; 4,112,774; 4,053,123; and 6,453,669, each of which are herein incorporated by reference in their entirety to the extent they do not conflict with the present disclosure.

In certain rotorcraft constructions, each of the sensors used to collect data in a Rotor Track and Balance system is placed in close proximity to the main rotor and remotely from the helicopter's HUMS. Therefore, it would be advantageous to provide a wireless RTB system that overcomes the disadvantages associated with traditional wired systems (e.g., weight and cable management) and solves the challenges associated with traditional wireless systems, such as discontinuous data acquisition, data synchronization, and sensor power conservation.

SUMMARY OF THE INVENTION

The present invention is directed to a rotor track and balance system for rotorcraft that includes, inter alia, a data processing unit, a tachometer sensor and at least one accelerometer. The tachometer sensor is located remotely from the data processing unit and is mounted proximate to the rotating blades of the rotorcraft. The tachometer sensor is adapted to measure the speed and position of the rotating blades and to wirelessly transmit speed and position data to the data processor.

The at least one accelerometer is also located remotely from the data processing unit and is preferably mounted proximate to the rotating blades of the rotorcraft. However, those skilled in the art will readily appreciate that the vibration sensors could be positioned remotely from the rotating blades. In certain rotorcraft applications, RTB vibrations are measured close to the rotor blades, but on others, vibrations are measured in the cabin, far away from the blades. The idea there is to minimize vibrations perceived by the crew. The accelerometer locations are typically specified by the aircraft manufacturer, who decides what vibration should be minimized using the RTB system.

Each accelerometer is adapted to measure vibration in the rotating blades and to wirelessly transmit vibration data to the data processor.

The data processing unit synchronizes the wireless data transmitted intermittently from the tachometer sensor and the wireless accelerometer(s) and determines necessary adjustments to be made in order to reduce the vibration anomalies in the rotor blades.

In a preferred embodiment, the data collected by the tachometer sensor and the at least one accelerometer is stored in a memory device associated with the sensor/accelerometer for a period of time prior to being transmitted to the data processor. The duration of the storage period could be predetermined, but it need not be. It is possible to have the transmission of data from the sensors controlled by the data processing unit—i.e., data can be stored until requested. For example, when the aircraft changes the flight regime rapidly that data processing unit may know that the particular set of vibration data is too contaminated to be useful and may never request its transmission.

It is envisioned that the tachometer sensor and each of the at least one accelerometers can include a clock and each of the clocks are synchronized by the data processing unit. Alternatively, the tachometer sensor and each of the at least one accelerometers can include a clock, but rather than synchronizing the clocks, the data processor calculates relative correction times for all of the clocks in order to synchronize the wireless data transmitted from the tachometer sensor and the at least one wireless accelerometer.

Preferably, the rotor track and balance system further includes a Health and Usage Management System for monitoring vibration anomalies in the rotorcraft's airframe and wherein the data processor is part of the rotorcraft's HUMS. In certain constructions of the present invention, the entire HUMS is located onboard the rotorcraft, and in other embodiments, only a portion of the rotorcraft's HUMS in located onboard and the remainder is provided in a ground-based HUMS.

Preferably, the rotorcraft's HUMS includes a memory device for storing the data transmitted wirelessly by the tachometer sensor and at least one accelerometer.

The sensor and accelerometers used in the system preferably include a power source. In certain constructions, the wireless sensor power source is a battery. Alternatively, the power source can include an energy harvesting unit.

In the rotor track and balance system of the present invention, it is envisioned that the tachometer sensor and each of the at least one accelerometers include a radio utilizing a transmission protocol which can be selected from the group of 802.11, 802.15.4 or 802.16 or other similar wireless protocols.

It is envisioned that the rotor track and balance system can further include a backup tachometer sensor for redundancy which is located remotely from the data processing unit and mounted proximate to rotating blades of the rotorcraft. The back-up tachometer sensor also may be adapted to measure the speed and position of the rotating blades and transmit speed and position data to the data processor.

The present invention is also directed to a method for tracking and balancing rotating blades of a rotorcraft, which includes, among other steps, the steps of providing a data processing unit, positioning a tachometer sensor onboard the rotorcraft remotely from the data processing unit and proximate to the rotating blades of the rotorcraft; measuring with the tachometer sensor the speed and position of the rotating blades; and transmitting wirelessly speed and position data from the tachometer sensor to the data processor.

The method further includes the steps of: positioning at least one accelerometer onboard the rotorcraft remotely from the data processing unit and preferably proximate the rotating blades of the rotorcraft; measuring using each accelerometer vibration in the rotating blades; and transmitting wirelessly for each accelerometer vibration data to the data processor. As noted above, the accelerometers may be mounted remotely from the rotor blades without departing from the inventive aspects of the present disclosure.

Moreover, the data processor synchronizes the wireless data transmitted from the tachometer sensor and each of the at least one wireless accelerometers; and determines the necessary adjustments to be made in order to reduce any vibration anomalies in the rotor blades.

In certain embodiments of the present invention, the method further includes the step of storing in a memory device the data collected by the tachometer sensor and the at least one accelerometer for a period of time prior to transmitting the date to the data processor.

It is also envisioned that the presently disclosed method can include the steps of: providing the tachometer sensor and each of the at least one accelerometers with a clock; and synchronizing the clock using the data processing unit. Alternatively, the method can include the steps of: providing the tachometer sensor and each of the at least one accelerometers with a clock; and calculating using the data processor relative correction times for all of the clocks in order to synchronize the wireless data transmitted from the tachometer sensor and the at least one wireless accelerometer.

The present invention is also directed to a track and balance system for rotating blades of a rotorcraft that includes, inter alia, a tachometer sensor, a plurality of vibration sensors and a data processor. The tachometer sensor is mounted proximate to the rotating blades of the rotorcraft and is adapted to measure the speed and position of the rotating blades and wirelessly transmit speed and position data.

The plurality of vibration sensors are also mounted preferably proximate to the rotating blades of the rotorcraft and each vibration sensor is adapted to measure vibration anomalies in the rotating blades and wirelessly transmit vibration data.

The data processor is associated with an onboard Health and Usage Management System which is adapted and configured to receive the speed and position data transmitted by the tachometer sensor and the vibration data transmitted by the plurality of vibration sensors. The Health and Usage Management system commands the sensors as to when data is to be acquired, when data is to be transmitted, and determines necessary adjustments to be made in order to reduce the vibration anomalies in the rotor blades.

It is envisioned that the data collected by the tachometer sensor and the vibration sensors is stored in a memory device for a period of time prior to being transmitted to the data processor.

Preferably, the tachometer sensor and the vibration sensors each include a clock and each clock is synchronized by the data processing unit.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the wireless Rotor Track and Balance systems and methods of the subject invention without undue experimentation, preferred embodiments thereof will be described in detail herein below with reference to certain figures, wherein.

DETAILED DESCRIPTION OF PREFERRED EMBODIMENTS

Disclosed herein are detailed descriptions of specific embodiments of the wireless Rotor Track and Balance (RTB) system of the present invention. It will be understood that the disclosed embodiments are merely examples of the way in which certain aspects of the invention can be implemented and do not represent an exhaustive list of all of the ways the invention may be embodied. Indeed, it will be understood that the systems, devices, and methods described herein may be embodied in various and alternative forms. Well-known components, materials or methods are not necessarily described in great detail in order to avoid obscuring the present disclosure.

It should be noted that many rotorcraft do not monitor the track of the rotor blades and simply collect vibration data. Even though these systems are technically only rotor balancing systems they are often still referred to as rotor track and balance systems. Moreover, a person skilled in the art would readily appreciate that the present invention can be used with either system without departing from the inventive aspects of the present disclosure.

Figure 1:
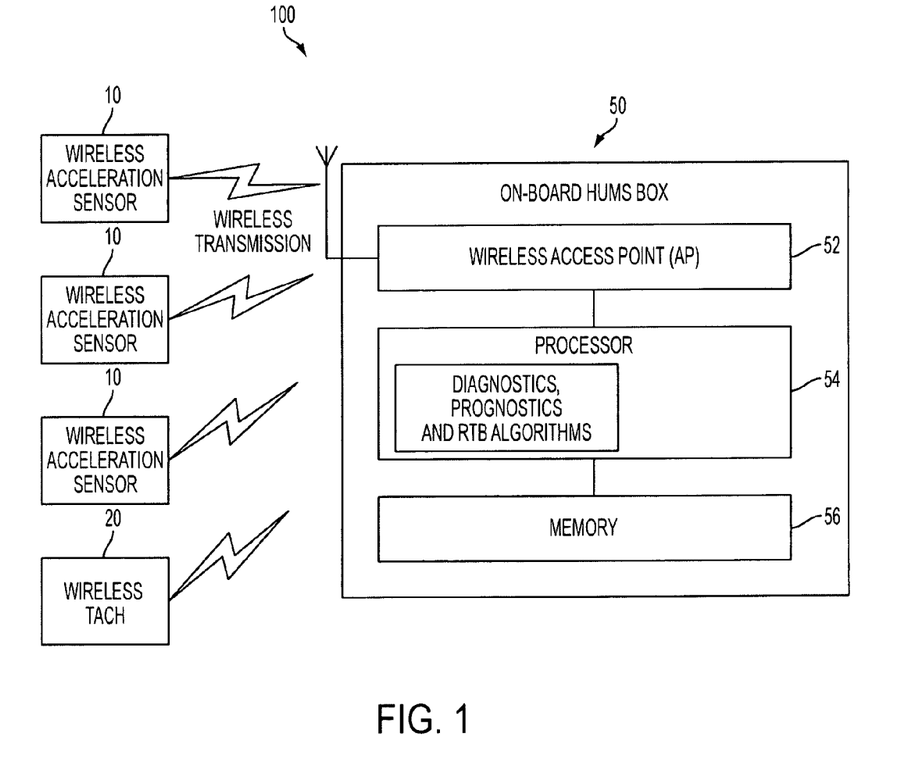
FIG. 1 is diagram illustrating the system architecture for an embodiment of the wireless RTB system of the present invention which details the communication between the wireless RTB sensors and the rotorcraft's HUMS.

Referring now to the drawings wherein similar reference numerals identify similar structural features or aspects of the subject invention. FIG. 1 provides a diagram illustrating the system architecture for an embodiment of the wireless RTB system of the present invention, which has been designated as reference numeral 100.

Wireless RTB system 100 includes an on-board HUMS box 50, three wireless acceleration sensors 10 and a wireless tachometer sensor 20. The HUMS box 50 contains, among other elements, a wireless access point (WAP) 52, a processor 54 and a memory device 56.

FIG. 1 details the communication between the wireless sensors 10/20 and the rotorcraft's HUMS box 50. Wireless RTB system 100 acquires data from tachometerometer 20 and vibration sensors 10 over the radio waves with no wires involved to connect the sensors 10/20 to the HUMS box 50. Once track and vibration data is collected from multiple sensor locations it will be stored in memory 56 of the HUMS box 50 and consequently processed by processor 54, whether onsite (as shown) or on separate station, to recommend the corrective action to balance the main rotor system and thereby reduce vibration. This corrective action may include: adding defined weights to specific locations on the rotor blades, adjusting pitch control rods, or other appropriate corrections to the rotor.

In the embodiment disclosed in FIG. 1, the processor 54 includes the diagnostic, prognostic and RTB algorithms for the rotorcraft's HUMS. However, as will be discussed herein below, the data received by the sensor in communication with the HUMS may be processed elsewhere.

Wireless RTB system 100 consists of two basic types of sensors: a wireless tachometer sensor 20 to measure the speed and position of rotating blades and wireless accelerometers 10 to measure any vibration anomaly. Tachometer sensor 20 is typically placed on the main frame of the helicopter below the moving rotor assembly (i.e. swash plate) of the rotorcraft. As noted previously, in certain rotorcraft, the vibration accelerometers used in the RTB system are located proximate the rotating blades of the rotorcraft. However, in certain rotorcraft applications, vibrations are measured in the cabin, far away from the blades. The idea there is to minimize vibrations perceived by the crew. The accelerometer locations are typically specified by the aircraft manufacturer, who decides what vibration should be minimized using the RTB system.

The turning speed and position of the blades as detected by tachometer sensor 20 provides the frequency and phase of the rotating frame which is necessary to transform the measured acceleration signals into the frequency domain, so that the transformed signals can be used by RTB algorithms to compute the optimum weights and locations on the blades or other corrective actions for the encountered vibration anomalies.

Figure 2:
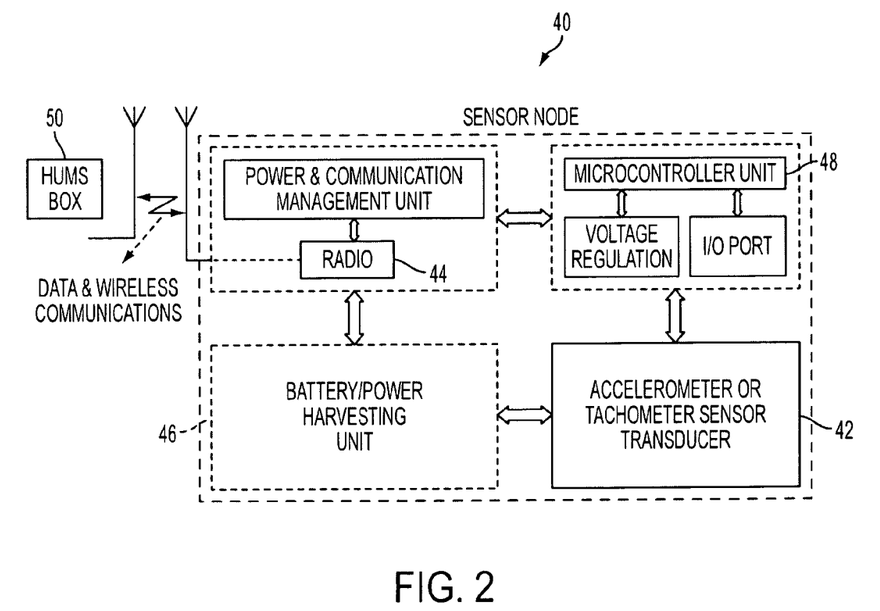
FIG. 2 is a block diagram of a wireless sensor node (acceleration or tachometerometer sensor) for use in the wireless RTB system of the present invention.

Referring now to FIG. 2 which provides a schematic of a typical sensor node 40 that can be used as part of the wireless RTB system of the present invention. Sensor node 40 can be either a vibration sensor 10 or a tachometer sensor 20. In addition to a sensing transducer 42, the sensing node 40 contains several other blocks to enable wireless communication between the sensor node 40 and the main HUMS box 50.

For example, sensor node 40 includes a radio unit 44 which may use one of the commercially available radio technologies, such as IEEE 802.11, 802.15.4, 802.16, or another suitable radio protocol. The choice of a particular wireless protocol for the system will depend on the amount of sensor data that is required to be collected, which in turn depends on the required quality and accuracy of RTB adjustments. Another factor influencing selection of the radio technology may be the power consumption vs. the capacity of the available power source. In prototype testing, the present inventors utilized IEEE 802.11 radio protocol which provided a high bit-rate and resulted in favorable power vs. data rate tradeoffs (i.e., it gave a minimal total energy expenditure for data transmission).

Sensor node 40 also includes a power source 46 and a microcontroller unit 48. Microcontroller unit 48 processes the data recorded by the sensors and controls the functionality of other components in sensor node 40. Power source 46 provides the operational energy for the sensor and may be for example, a replaceable battery or an energy harvesting or scavenging unit in which energy is derived from external sources (e.g., solar power, thermal energy, wind energy, salinity gradients, and kinetic energy), and is captured, and stored.

A marked difference between a wireless sensor in this invention and a wired analog sensor is that with wireless sensors it is not desirable to acquire and transmit data to the HUMS box continually, nor does the transmission of data occur simultaneously with the acquisition of data. Continuous acquisition of data would consume excessive amounts of sensor power in a wireless system. In wired analog sensors systems, acquisition and storage of data is essentially simultaneous and synchronous actions. Instead, the wireless sensor in this invention accomplishes the acquisition and storage of data as separate actions. For example the wireless sensor acquires data corresponding to a short time interval, e.g. 10 seconds, and then transmits the data in a short burst of several data packets later in time. Depending on the duration and amount of data acquired and on the particular radio protocol used, the data transmission process may last shorter or longer than the data acquisition process. Once acquisition and transmission of data is accomplished, the sensor is put into a low-power, 'sleep' state until the next data acquisition is scheduled. In this way, the acquisition of data is optimized for data computational performance while the transmission of data is optimized for sensor power consumption and other wireless performance goals. For example, the sensor may wait 10 minutes between each two 10 second acquisitions. The sleep interval and acquisition interval are programmable and determined by the application. Alternatively, the system may acquire data more often, or may even start a new data acquisition while the previously acquired data portion is still in process of being sent to the HUMS box.

Referring again to FIG. 1, the wireless RTB 100 system includes several vibration sensors 10 (accelerometers) and at least one tachometer sensor 20. The purpose of including a tachometerometer is to provide a common reference for all vibration data acquired by the accelerometers 10, so that the frequency of the rotating frame is known. For the RTB algorithm to provide usable solutions, all vibration data and the tachometerometer data needs to be synchronized. Wired sensor systems have an inherent high degree of synchronization, but wireless sensor systems do not and therefore a mechanism for synchronizing wireless data acquisition is required.

Two main approaches may be used for synchronizing the wireless sensors used in the wireless RTB system of the present invention. One method is to maintain synchronized clocks running on all sensors within the system. Then, the central node of the wireless network, or the access point AP (in this case the HUMS box), may command all the sensors to acquire their next portion of sensor data at a prescribed time in future. If all sensor clocks are tightly synchronized, then the data acquisition will start at the same time, and the corresponding data sets will have the same starting times. Algorithms to synchronize the different sensor node clocks to each other are well known. For example, pair-wise synchronization may be used in which each sensor adjusts its clock separately to match the AP's clock. Variations on this approach may also be used without departing from the scope of the present invention.

Another approach to the synchronization problem is to have the AP calculate relative correction terms for the clocks of all sensors in the wireless RTB system. If this is achieved, then the AP may command the sensors to acquire data at different values of their respective clocks, calculated in such a way that they all correspond to the same moment in time. Alternatively, appropriate correction and time-shifting may be performed on already collected sensor data. Such an AP-centered approach to sensor synchronization is well known.

Regardless of which synchronization approach is used, the net effect of including a tachometer sensor in the system architecture is that the various vibration signals may be jointly referenced to the same tachometer signal which characterizes rotation of the aircraft's rotor.

As noted above, the general architecture of the wireless RTB HUMS system including multiple wireless sensors is shown in FIG. 1. To the extent that these sensors may be co-located, a single wireless sensor module may process data from more than one accelerometer and tachometer sensor. The figures show the simple configuration where each sensor's data is provided by a single wireless sensor module. Note that the number of wireless accelerometers included in the system may be different from that shown in the figure. Moreover, those skilled in the art will readily appreciate that more than one wireless tachometerometer may be used for redundancy and there may be also other sensors, wired or wireless, used in the system for other purposes, such as an optical tracker.

Figure 3:
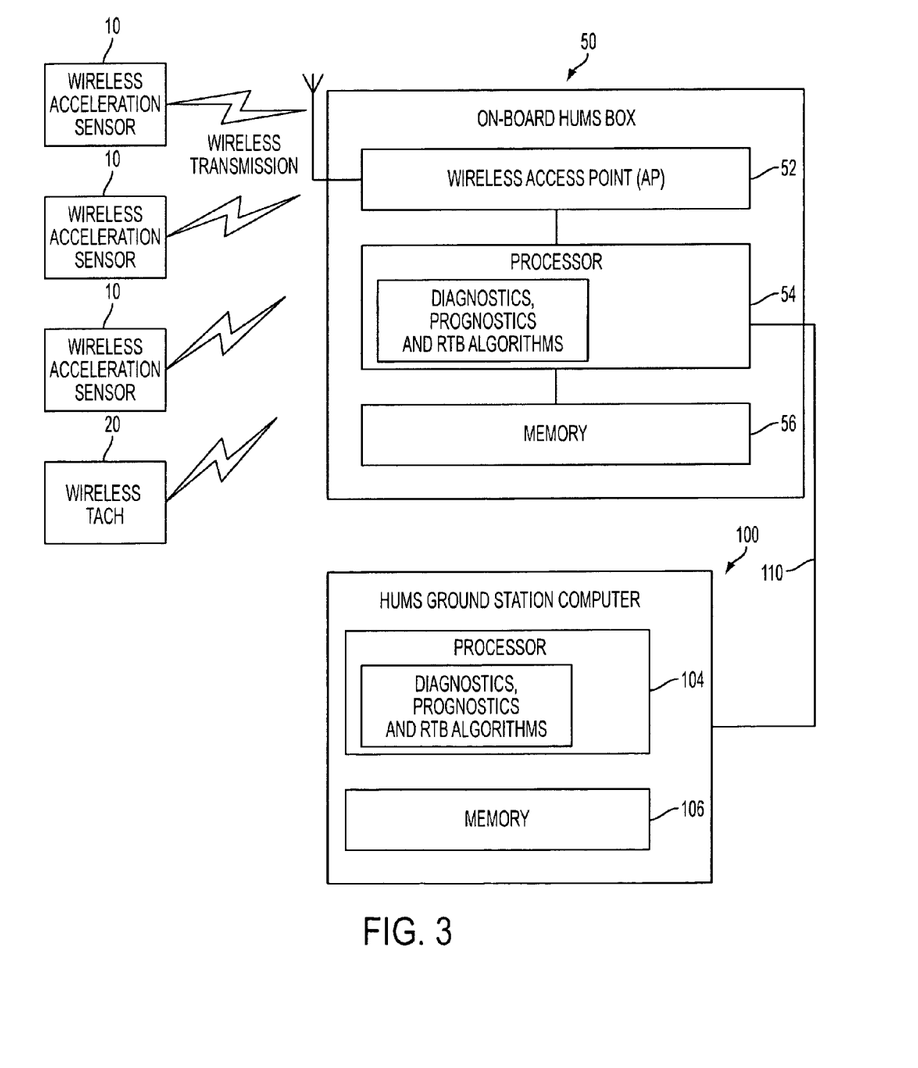
FIG. 3 is a diagram illustrating an exemplary architecture for communication between the wireless RTB system illustrated in FIG. 1 and a HUMS ground station computer.

The function of calculating the necessary rotor adjustments, i.e. the execution of the RTB algorithm, may be performed within the HUMS box, or may also be performed, fully or partially, within a separate ground-based computer, known as the HUMS ground station 100. Similar to the onboard HUMS box 50, the HUMS ground station can also include a processor 104 and memory unit 106. The data acquired by the HUMS box may be transferred to the ground station 100 via a wired connection 110, as shown in FIG. 3. This connection 110 may be an Ethernet link or another data link suitable for the system. Note that the wired connection in question would be established only temporarily, when the aircraft is on the ground, to enable transfer of the most recently acquired sensor data for further analysis. This link would be disconnected prior to the next flight.

Additionally, it is envisioned that different portions of the RTB algorithm may be performed within the onboard HUMS box 50 and within the ground station 100. For example, the HUMS box 50 may perform initial pre-processing of the data, while the ground station 100 may be responsible for user interface, accounting for user preferences regarding performing the RTB function, performing multi-objective optimization, etc. Other partitioning of the RTB calculations between the two modules is also possible.

Figure 4:
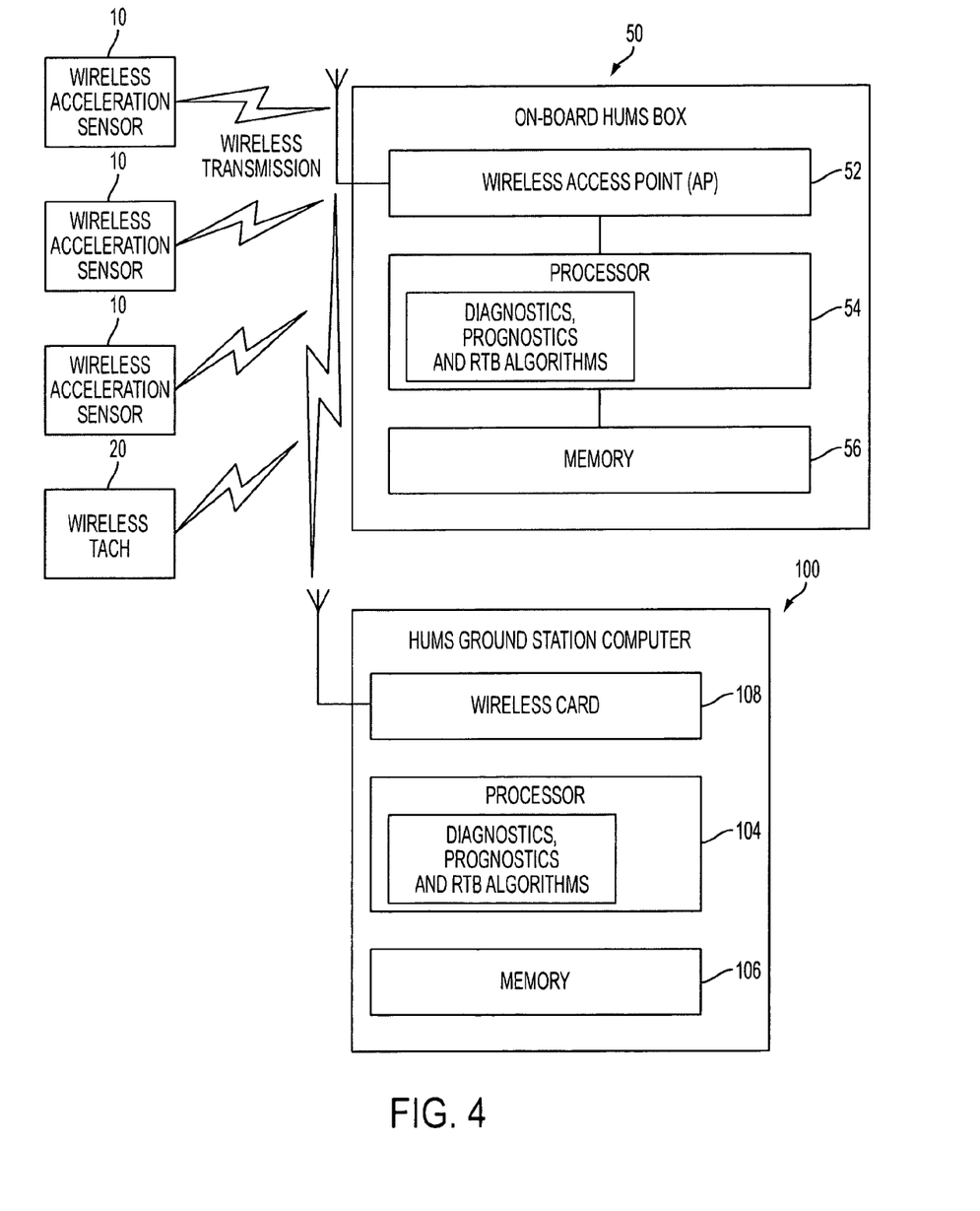
FIG. 4 is a diagram illustrating a further exemplary architecture for communication between the wireless RTB system illustrated in FIG. 1 and a HUMS ground station computer These and other aspects of the subject invention will become more readily apparent to those having ordinary skill in the art from the following detailed description of the invention taken in conjunction with the drawings.

An alternative to connecting the ground station 100 to the HUMS box 50 may be through the wireless connection, as shown in FIG. 4. In such an embodiment, the HUMS ground station would be equipped with a wireless card 108. Note that the wireless link used for this connection may be using the same protocol and wireless antenna as used by the wireless sensors. Alternatively, two different wireless technologies may be used for the sensors and for the connection to the ground station. The latter variant may be the case e.g. if data transfer from the sensors to the HUMS box in flight is subject to more stringent interference environment than the data link from the HUMS box to the HUMS ground station while the aircraft has landed.

Still further, another possibility of transferring data from the onboard HUMS 50 to the ground station 100 may involve a removable memory module, physically moved from one device to another. This may be a USB flash drive or another suitable memory medium.

Those skilled in the art will readily appreciate that some of the sensors are wireless, but not all of the sensors need to be wireless. Moreover, some of the sensors can be powered by the aircraft and communicate wirelessly and certain sensors could be self powered. This distinction can be based on factors, such as for example, the criticality of the sensor and/or the sensor's power requirements (e.g., if the sensor is power-inefficient then a battery or using energy harvesting techniques may not provide sufficient power).

As noted above, the use of wireless sensors pose significant challenges that do not exist in wired RTB systems used today such as sensor power management and data acquisition synchronization. This present invention provides systems and methods which can be used to overcome these challenges and achieve a high performance RTB analysis and adjustment without the added weight, complexity and cost of wired sensor systems.

What is claimed is:

1. A rotor track and balance system for rotorcraft comprising:
    a) a data processing unit;
    b) a tachometer sensor located remotely from the data processing unit and mounted proximate to rotating blades of the rotorcraft, the tachometer sensor being adapted to measure the speed and position of the rotating blades and wirelessly transmit speed and position data to the data processor:
    c) at least one accelerometer located remotely from the data processing unit on the rotorcraft, each accelerometer being adapted to measure vibration in the rotating blades and wirelessly transmit vibration data to the data processor;
    wherein the data processing unit synchronizes the wireless data transmitted from the tachometer sensor and the at least one wireless accelerometer and determines necessary adjustments to be made in order to reduce any vibration anomalies in the rotor blades, wherein the wireless data from the tachometer sensor and the at least one wireless accelerometer is synchronized prior to processing by the data processing unit.

2. The rotor track and balance system as recited in claim 1, wherein the data collected by the tachometer sensor and the at least one accelerometers is stored in a memory device for a period of time prior to being transmitted to the data processor.

3. The rotor track and balance system as recited in claim 1, wherein the tachometer sensor and each of the at least one accelerometers include an internal clock and each of the clocks are synchronized by the data processing unit.

4. The rotor track and balance system as recited in claim 1, wherein the tachometer sensor and each of the at least one accelerometers include an internal clock and wherein the data processor calculates relative correction times for all of the clocks in order to synchronize the wireless data transmitted from the tachometer sensor and the at least one wireless accelerometer.

5. The rotor track and balance system as recited in claim 1, further comprising a Health and Usage Management System for monitoring the state of the rotorcraft and wherein the data processor is part of the HUMS.

6. The rotor track and balance system as recited in claim 5, wherein at least a portion of the rotorcraft's HUMS in located onboard.

7. The rotor track and balance system as recited in claim 5, wherein the rotorcraft's HUMS includes a memory device for storing the data transmitted wirelessly by the tachometer sensor and the at least one accelerometer.

8. The rotor track and balance system as recited in claim 1, wherein the tachometer sensor and at least one of the accelerometers include an energy harvesting unit.

9. The rotor track and balance system as recited in claim 1, wherein the tachometer sensor and each of the at least one accelerometers include a radio utilizing a transmission protocol which is selected from the group of IEEE 802.11, 802.15.4 or 802.16.

10. The rotor track and balance system as recited in claim 1, further comprising a backup tachometer sensor located remotely from the data processing unit and mounted proximate to rotating blades of the rotorcraft, the tachometer sensor being adapted to measure the speed and position of the rotating blades and transmit speed and position data to the data processor.

11. A method for tracking and balancing rotating blades of a rotorcraft, the method comprising the steps of:
 a) providing a data processing unit;
 b) positioning a tachometer sensor onboard the rotorcraft remotely from the data processing unit and proximate to the rotating blades of the rotorcraft;
 c) measuring with the tachometer sensor the speed and position of the rotating blades;
 d) transmitting wirelessly speed and position data from the tachometer sensor to the data processor;
 e) positioning at least one accelerometer onboard the rotorcraft remotely from the data processing unit;
 f) measuring using each accelerometer vibrations in the rotating blades;
 g) transmitting wirelessly for each accelerometer vibration data to the data processor;
 h) synchronizing using the data processor the wireless data transmitted from the tachometer sensor and each of the at least one wireless accelerometers; and
 i) determining using the data processor necessary adjustments to be made in order to reduce any vibration anomalies in the rotor blades,
 wherein the synchronizing the wireless data transmitted from the tachometer sensor and each of the at least one wireless accelerometers is done prior to wirelessly transmitting the data to the data processing unit.

12. The method for tracking and balancing rotating blades of a rotorcraft as recited in claim 11, further comprising the step of storing in a sensor memory device the data collected by the tachometer sensor and the at least one accelerometer for a period of time prior to transmitting the date to the data processor.

13. The method for tracking and balancing rotating blades of a rotorcraft as recited in claim 11, further comprising the steps of:
 i) providing the tachometer sensor and each of the at least one accelerometers with a clock; and
 ii) synchronizing the clock using the data processing unit.

14. The method for tracking and balancing rotating blades of a rotorcraft as recited in claim 11, further comprising the steps of:
 i) providing the tachometer sensor and each of the at least one accelerometers with a clock; and
 ii) calculating using the data processor relative correction times for all of the clocks in order to synchronize the wireless data transmitted from the tachometer sensor and the at least one wireless accelerometer.

15. The method for tracking and balancing rotating blades of a rotorcraft as recited in claim 11, further comprising the step of providing a Health and Usage Management System for monitoring vibration anomalies in the rotorcraft's airframe and wherein the data processor is part of the HUMS.

16. The method for tracking and balancing rotating blades of a rotorcraft as recited in claim 15, wherein at least a portion of the rotorcraft's HUMS in provided onboard.

17. The method for tracking and balancing rotating blades of a rotorcraft as recited in claim 16, wherein the speed and position data and vibration data is transmitted wirelessly from the rotorcraft's onboard HUMS to a HUMS ground station computer for analysis.

18. A track and balance system for rotating blades of a rotorcraft comprising:
 a) a tachometer sensor mounted proximate to the rotating blades of the rotorcraft, the tachometer sensor being adapted to measure the speed and position of the rotating blades and wirelessly transmit speed and position data;
 b) a plurality of vibration sensors mounted on the rotorcraft, each vibration sensor being adapted to measure vibrations in the rotating blades and wirelessly transmit vibration data; and
 c) a data processor associated with an onboard Heath and Usage Management System which is adapted and configured to receive the speed and position data transmitted by the tachometer sensor and the vibration data transmitted by the plurality of vibration sensors; and
 wherein the Health and Usage Management system commands the sensors as to when data is to be acquired, when data is to be transmitted, and determines necessary adjustments to be made in order to reduce any vibration anomalies in the rotor blades,
 wherein the data processor synchronizes the acquired data prior to transmitting the data to the data processor.

19. The track and balance system for rotating blades of a rotorcraft as recited in claim 18, wherein the data collected by the tachometer sensor and the vibration sensors is stored in a memory device for a period of time prior to being transmitted to the data processor.

20. The track and balance system for rotating blades of a rotorcraft as recited in claim 18, wherein the tachometer sensor and the vibration sensors include a clock and each of the clocks are synchronized by the data processing unit.

* * * * *